Nov. 28, 1933.    L. W. BRYAN    1,936,823
RIM CONSTRUCTION
Filed May 21, 1932    3 Sheets-Sheet 3
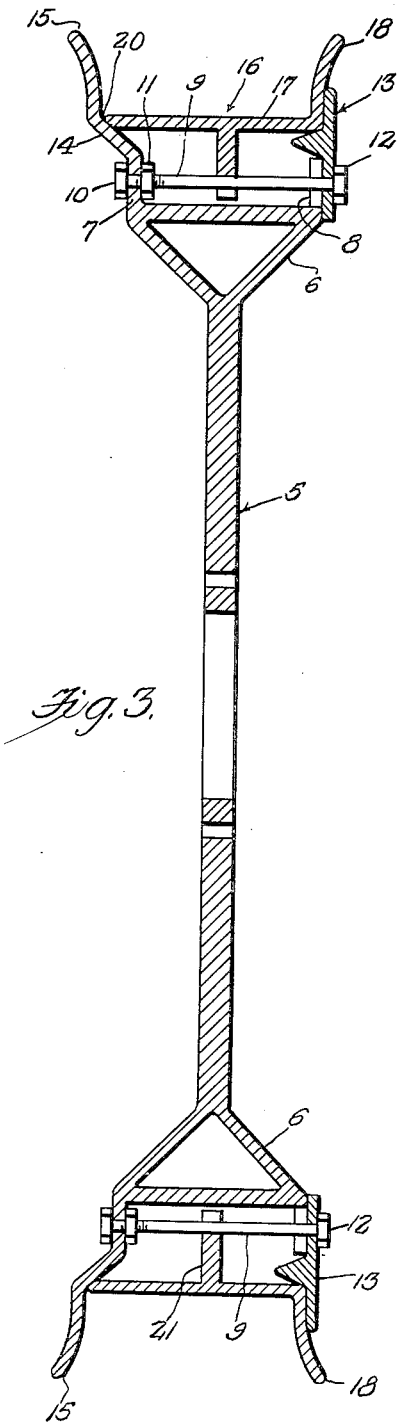
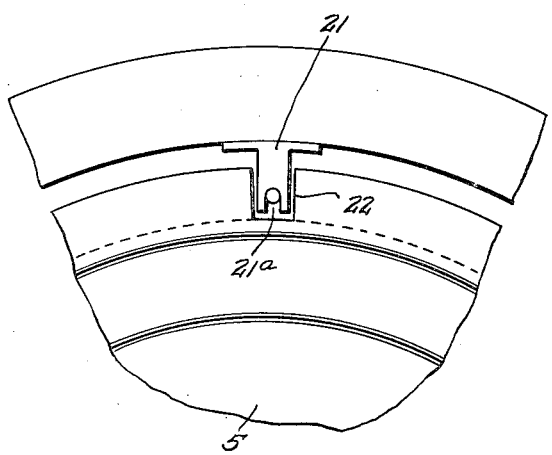
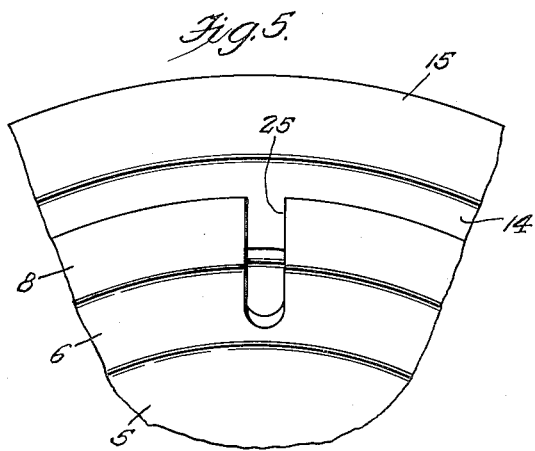
Inventor
Lyle W. Bryan,
By Clarence A. O'Brien
Attorney Patented Nov. 28, 1933

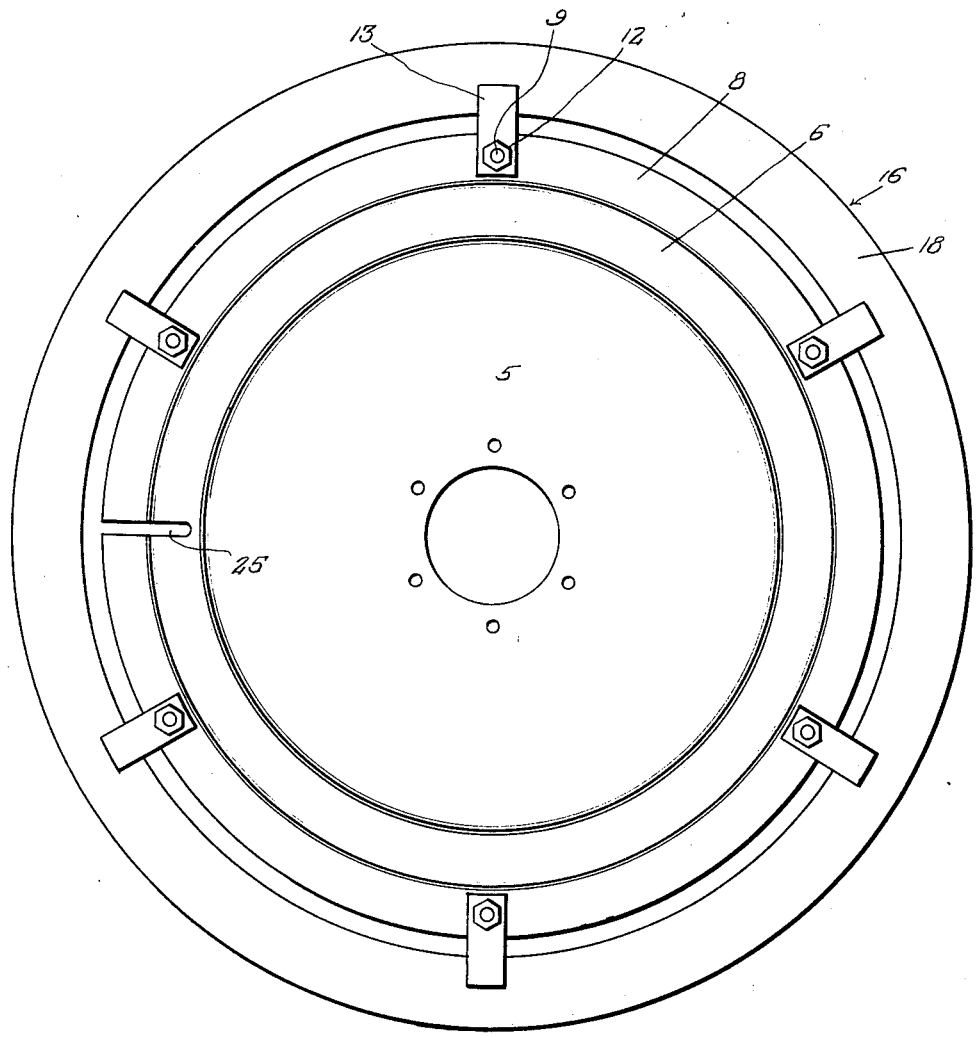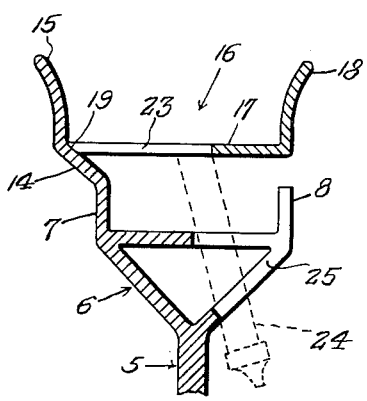

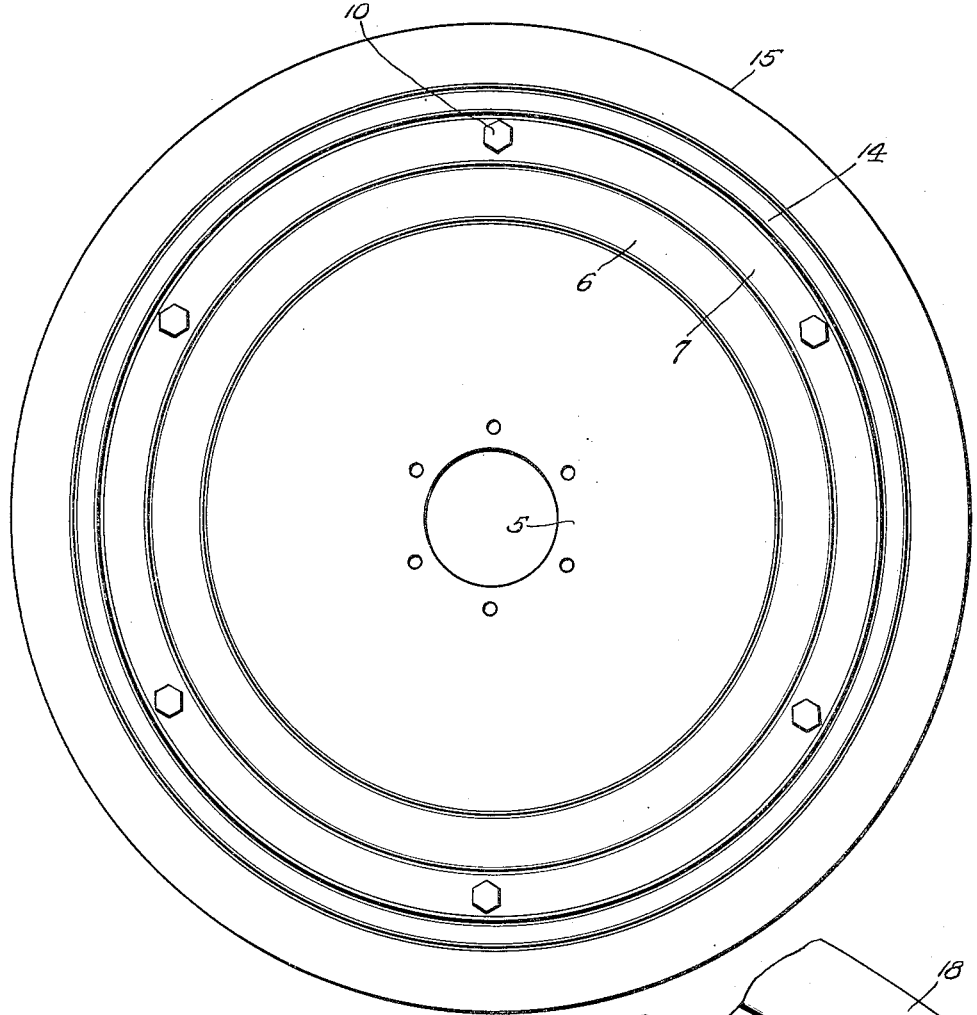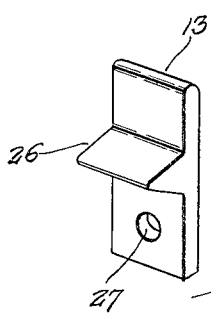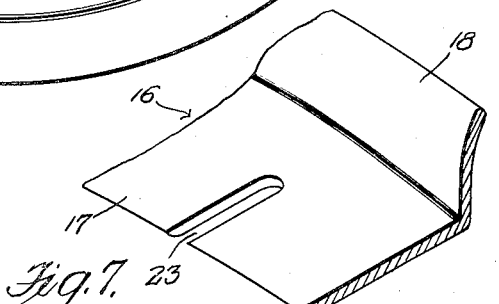

1,936,823

UNITED STATES PATENT OFFICE 1,936,823

RIM CONSTRUCTION

Lyle W. Bryan, Kansas City, Mo.

Application May 21, 1932. Serial No. 612,815

6 Claims. (Cl. 152—21)

My invention relates to improvements in rim constructions for vehicle wheels.

It is an important object of my invention to provide a rim construction for vehicle wheels of the demountable type, the rim construction itself being easily separable from the demountable wheel so that the time and effort required for removing and replacing pneumatic tires on wheels is considerably reduced and lessened.

It is also an important object of my invention to provide a rim construction of the type described which is of simple and inexpensive construction and may be utilized in connection with many different types of demountable vehicle wheels, either by forming upon the wheel itself a tire retaining flange structure in integral manner or otherwise attaching the same to the wheel, and placing in cooperative position therewith a removable rim section, whereby a novel tire mounting construction is produced.

Other objects and advantages of my invention will be apparent from a reading of the following description and the drawings wherein:—

Figure 1 is an elevational view of the outward side of a vehicle wheel equipped with the structure of my invention.

Figure 2 is a back or inward view of Figure 1.

Figure 3 is a transverse vertical sectional view through Figure 1.

Figure 4 is an enlarged elevational detail of the construction showing the anchor means.

Figure 5 is an enlarged elevational detail of the construction showing a tire valve accommodating means.

Figure 6 is a detailed transverse vertical sectional view through the construction showing the cooperation of parts in Figure 5.

Figure 7 is a perspective view of a portion of the removable rim showing the tire valve accommodating means thereon.

Figure 8 is a view of one form of lug bolt capable of being used with the construction.

Referring in detail to the drawings, wherein like numerals refer to like parts, the numeral 5 generally designates a suitable type of demountable wheel, such as an automobile wheel of the disk type which has a felly portion 6 of peripherally unbroken character and provided with the transversely spaced circumferentially arranged radially extended walls 7 and 8 through which is projected a plurality of lug bolts 9 having the head 10 and the lock nut 11 engaged with the inside of the wall 7 to lock the lug bolt in position. The lug bolt extends beyond the outer wall 8 where it is provided with a clamping nut 12 adapted to engage and press and hold into position the lugs generally designated 13, the detailed character of which will be referred to later herein.

While I do not claim any type of wheel or any special type of felly, I alter the conventional construction of a wheel recited above by providing the extension 14 upon the inner wall 7. This extension proceeds radially and axially outwardly at an angle and merges into a tire retaining lip 15. The extension 14 and the tire retaining lip 15 are of continuous construction. They may be formed integral with the felly 6 and the peripheral wall 7, or they may be bolted or otherwise secured thereto in any suitable manner so as not to be displaceable in service.

With the construction described above I utilize a removable tire supporting rim generally designated 16 which comprises an annular body 17 provided at what will be called the outboard edge with an upstanding outwardly curved tire retaining lip 18 similar to the lip 15. The opposite edge portion of the annular body 17 is beveled at its lower corner as indicated at 19 in such a manner that it will rest upon and conform to the angularity of the radially outward surface of the extension 14 when in place upon the wheel. In order to provide that there will be no interference with a proper engagement of the beveled portion 19 with the outer surface of the extension 14 when wear of the beveled portion and of the said outer surface takes place in service, the sharp corner on the upper side of the inboard edge of the annular body 17 is cut off so as to provide a slight clearance with the extension 14 as indicated at 20.

Depending from a portion intermediate the edges of the annular body 17 is a conventional type of anchor 21 provided with the notch in its radially inward end as indicated at 22 enabling it to straddle one of the rim bolts 9 to maintain the removable rim 16 against rotating on the wheel.

The inboard or free edge of the annulus 17 is provided with a transverse slot 23 for accommodating the valve stem 24 of the pneumatic tire. The peripheral wall 8 of the felly 6 is provided with a transverse slot 25 which is adapted to be registered by the slot 23 of the removable rim section so as to permit the valve 24 to come through and have a convenient position for inflation and deflation purposes at the outboard side of the wheel and removable rim.

For properly centering and securing the removable rim 16 upon the wheel with the inboard edge 19 properly seated upon the extension 14, there is provided a plurality of lugs generally designated 13 which are elongated blocks provided at one side intermediate the ends thereof with an isosceles wedge 26 which is to be engaged between the radially outward edge of the outboard peripheral wall 8 and the radially inward side of the outward portion of the removable rim 16 under the tire retaining lip 18 as seen in Figure 3. The radially inward end portion of the lug is apertured as indicated at 27 to receive a lug bolt 9, and as the lug bolt nut 12 is rotated so as to compress the lug bolt, the inboard movement of the lug bolt nut will cause separation of the outboard portion of the removable rim from the outward edge of the peripheral wall 8 so as to give the annulus 17 a proper and desirable position generally parallel with the axis of the wheel in a properly centered concentric relationship with the wheel. It will be obvious that any sort of lugs and bolts capable of accomplishing the same general purpose would be suitable, and any manner or means of attaching them so as to properly center and secure, in the properly concentric manner, the removable tire rim.

A wheel equipped and constructed as recited may be changed from either a front or back wheel position or to either side of the motor vehicle or the like. All that is necessary to do in order to place a tire upon the construction is to turn off the lug bolt nuts 12 so as to release the lugs 13. Then, the removable rim 16 may be drawn freely and easily from the wheel.

To place a pneumatic tire upon the construction it is simply necessary to press the free edge of the annulus 17 into the tire annulus, which may be lying on a surface. This method of assembly may be reversed, the rim being pressed down upon the ground and the tire placed thereon into place.

Then, the removable rim with the tire thereon is placed easily and freely upon the wheel with the inboard edge of the annulus roughly centered upon the extension portion 14. This is followed by placing of the lugs 13 upon the lug bolts and replacing the lug bolt nuts and tightening the same whereby to cause the lugs to properly center and clamp the rim in the position described.

To take off a tire from the wheel, the lug bolt nuts are backed off, the lugs removed and the rim carrying the tire simply easily lifted off.

Because of the peculiar construction of my invention, the lugs 13 are free, there is a large space between the felly of the wheel and the removable rim, so that there is no tight fitting or catching to hinder or delay the removal or replacing of the rim upon the wheel. Inasmuch as the felly, the tire retaining lips and the removable rim are unbroken, that is, not split or in sections, there are no precautions to observe or dangers to be avoided in mounting or demounting a tire for repair or replacement purposes as obtains in the case of such sectional or split rim constructions.

There is only one necessity for care, if it may be called such, and that is to see that the slot 23 in the removable rim is properly aligned and registered with the slot 25 in the felly in order to properly accommodate and pass the valve stem 24. Because of the provision of the anchors 21, the removable rim is positively retained once it has been placed upon the wheel against rotation relative to the wheel.

It will be observed that my invention makes tire changing and repairing easier, reducing the time required for such operations, and the operations are attended with no danger or inconvenience. Practically all of the dangers and inconveniences now experienced by motorists, and by garage employees, especially when changing tires on the road, are done away with. The simplified operation of the device of my invention is more in keeping with modern developments of convenience and safety which have been brought about in the other parts of motor vehicles, and for this reason my invention should appeal to that large class of persons who own and operate motor vehicles, and who occasionally attend to the changing or replacing of tires.

Though I have shown and described herein a preferred embodiment of the invention, it is to be definitely understood that I do not desire to limit the application of the invention therethrough, and any change or changes may be made in material and structure and arrangement of parts, within the spirit of the invention and the scope of the subjoined claims.

What is claimed is:—

1. A wheel comprising a wheel body having a felly, a pair of spaced walls on the felly, a radially and axially outward extension on the inward wall having a portion constituting a tire confining lip, a removable tire supporting rim formed on its outboard side with a tire confining lip, and lugs engageable with the outboard side of the tire supporting rim and outboard one of said walls, lug bolts traversing the spaced walls and the lugs for securing the lugs, and a wedge formation on the lugs for engagement with a radial portion of the said outboard one of the spaced walls and a radially inward portion of the tire supporting rim for adjustably supporting the outboard side of the tire supporting rim while the inboard side of the rim is supported on a portion of outward extension of the felly.

2. A wheel comprising a wheel body having a felly, a pair of spaced walls on the felly, a radially and axially outward extension on the inboard wall having a portion constituting a tire confining lip, a removable tire supporting rim formed on its outboard side with a tire confining lip, and lugs engageable with the outboard side of the tire supporting rim and outboard one of said walls, lug bolts traversing the spaced walls and the lugs for securing the lugs, and a wedge formation on the lugs for engagement with a radial portion of the said outboard one of the spaced walls and a radially inward portion of the tire supporting rim for adjustably supporting the outboard side of the tire supporting rim while the inboard side of the rim is supported on a portion of outward extension of the felly, and anchors extending radially inwardly from the rim having openings for receiving the bolts to anchor the rim against turning relative to the wheel.

3. A wheel comprising a wheel body having a felly, a pair of spaced walls on the felly, a radially and axially outward extension on the inboard wall having a portion constituting a tire confining lip, a removable tire supporting rim formed on its outboard side with a tire confining lip, and lugs engageable with the outboard side of the tire supporting rim and outboard one of said walls, lug bolts traversing the spaced walls and the lugs for securing the lugs, and a wedge formation on the lugs for engagement with a radial portion of the said outboard one of the spaced walls and a radially inward portion of the tire supporting rim for adjustably supporting the outboard side of the tire supporting rim while the inboard side of the rim is supported on a portion of outward extension of the felly, said radially and axially outward extension of the inboard wall on the felly having a portion presenting an angular surface upon which the inboard edge of the rim is arranged to ride outwardly when the bolts are tightened whereby a more secure and perfectly alined engagement of the rim and wheel is obtained.

4. A wheel comprising a wheel body having a felly, a pair of spaced walls on the felly, a radially and axially outward extension on the inboard wall having a portion constituting a tire confining lip, a removable tire supporting rim formed on its outboard side with a tire confining lip, and lugs engageable with the outboard side of the tire supporting rim and outboard one of said walls, lug bolts traversing the spaced walls and the lugs for securing the lugs, and a wedge formation on the lugs for engagement with a radial portion of the said outboard one of the spaced walls and a radially inward portion of the tire supporting rim for adjustably supporting the outboard side of the tire supportng rim while the inboard side of the rim is supported on a portion of outward extension of the felly, said radially and axially outward extension of the inboard wall on the felly having a portion presenting an angular surface upon which the inboard edge of the rim is arranged to ride outwardly when the bolts are tightened whereby a more secure and perfectly alined engagement of the rim and wheel is obtained, the inboard edge of the rim being bevelled at substantially the same angle as the angular surface so as to facilitate the cooperation stated.

5. A wheel comprising a wheel body having a felly, a pair of spaced walls on the felly, a radially and axially outward extension on the inboard wall having a portion constituting a tire confining lip, a removable tire supporting rim formed on its outboard side with a tire confining lip, and lugs engageable with the outboard side of the tire supporting rim and outboard one of said walls, lug bolts traversing the spaced walls and the lugs for securing the lugs, and a wedge formation on the lugs for engagement with a radial portion of the said outboard one of the spaced walls and a radially inward portion of the tire supporting rim for adjustably supporting the outboard side of the tire supporting rim while the inboard side of the rim is supported on a portion of outward extension of the felly, said bolts traversing the lugs radially inward of the wedge formation.

6. In a demountable rim structure, a felly having transversely spaced radially extended walls, an extension on the inboard wall providing an angular rim supporting surface and a tire confining lip, a removable rim having on its outboard side a tire confining lip, lugs having a wedge formation, bolts traversing the walls and the lugs for clamping the lugs, the wedge formation of the lugs being disposed between the radially outward edge of the outboard wall and a radially inward portion of the rim, and the inboard part of the rim being engaged with the angular surface so as to ride outwardly thereon when the bolts are tightened for centering and tightening the rim with respect to the felly.

LYLE W. BRYAN.